(12) United States Patent
Wu et al.

(10) Patent No.: US 9,341,232 B2
(45) Date of Patent: May 17, 2016

(54) TWO-COMPONENT CORD AND METHOD FOR MOLDED POWER TRANSMISSION BELTS

(71) Applicant: The Gates Corporation, Denver, CO (US)

(72) Inventors: Shawn Xiang Wu, Rochester Hills, MI (US); Charlie Ochoa, Columbia, MO (US); Lance Hall, Wilkesboro, NC (US); Tae Hee Cheong, Troy, MI (US)

(73) Assignee: GATES CORPORATION, Denver, CO (US)

( * ) Notice: Subject to any disclaimer, the term of this patent is extended or adjusted under 35 U.S.C. 154(b) by 287 days.

(21) Appl. No.: 14/075,111

(22) Filed: Nov. 8, 2013

(65) Prior Publication Data

US 2015/0133250 A1     May 14, 2015

(51) Int. Cl.
| | |
|---|---|
| *F16G 1/10* | (2006.01) |
| *B29D 29/08* | (2006.01) |
| *B29C 43/30* | (2006.01) |
| *B29L 29/00* | (2006.01) |

(52) U.S. Cl.
CPC ............... *F16G 1/10* (2013.01); *B29C 43/305* (2013.01); *B29D 29/08* (2013.01); *B29L 2029/00* (2013.01)

(58) Field of Classification Search
CPC ............... F16G 1/10; F16G 1/16; F16G 5/08; B29L 2029/00; B29C 47/0465
USPC ....................................... 474/261; 264/171.1
See application file for complete search history.

(56) References Cited

U.S. PATENT DOCUMENTS

| | | | |
|---|---|---|---|
| 3,078,206 A | | 2/1963 | Skura |
| 3,533,225 A | | 10/1970 | Steiding et al. |
| 3,855,870 A | * | 12/1974 | Schnackenberg ......... F16G 5/08 474/260 |
| 4,184,822 A | | 1/1980 | Schwabauer |
| 4,681,558 A | * | 7/1987 | Rausch .................. B29D 29/08 156/137 |
| 4,885,928 A | | 12/1989 | Davis et al. |
| 5,429,555 A | | 7/1995 | Beckh |

(Continued)

FOREIGN PATENT DOCUMENTS

| | | | |
|---|---|---|---|
| CH | 492545 A | | 6/1970 |
| EP | 960975 A2 | | 12/1999 |

(Continued)

OTHER PUBLICATIONS

European Patent Office, International Search Report, mailing date Feb. 20, 2015, International application No. PCT/US2014/064502.

(Continued)

*Primary Examiner* — William E Dondero
*Assistant Examiner* — Robert T Reese
(74) *Attorney, Agent, or Firm* — Paul N. Dunlap, Esq.; Jeffrey A. Thurnau, Esq.

(57) ABSTRACT

A belt having a tensile cord embedded in the belt, extending in a longitudinal direction and made up of two components: a tensile component and a sacrificed component. The sacrificed component may be broken into a plurality of discontinuous segments. The tensile component provides most of the reinforcement of the belt. The sacrificial component of the precursor cord protects the tensile component from excessive stretching during cord treating and winding, but breaks, melts, or yields during mandrel expansion during the belt molding process, thus preserving the stretchability of the tensile component.

23 Claims, 3 Drawing Sheets

(56) References Cited

U.S. PATENT DOCUMENTS

| | | | |
|---|---|---|---|
| 5,595,284 A | 1/1997 | Takahashi et al. | |
| 5,802,839 A * | 9/1998 | Van Hook | D02G 3/28 474/263 |
| 6,609,990 B2 | 8/2003 | Kopang | |
| 7,051,507 B2 | 5/2006 | Fritsch et al. | |
| 7,721,780 B2 | 5/2010 | Donckels et al. | |
| 2003/0024230 A1 * | 2/2003 | Knutson | D02G 3/286 57/204 |
| 2003/0211911 A1 * | 11/2003 | Welk | F16G 1/10 474/260 |
| 2005/0215372 A1 * | 9/2005 | Wood | F16G 1/08 474/205 |
| 2005/0245340 A1 | 11/2005 | Ballhausen et al. | |
| 2010/0143716 A1 | 6/2010 | Joern et al. | |
| 2010/0173740 A1 | 7/2010 | Mori et al. | |
| 2011/0241251 A1 * | 10/2011 | Rubino | B29C 43/28 264/259 |
| 2013/0072335 A1 | 3/2013 | Yomoda et al. | |
| 2013/0225346 A1 * | 8/2013 | Gibson | F16G 1/08 474/260 |
| 2014/0073468 A1 * | 3/2014 | Knutson | F16G 5/08 474/260 |
| 2014/0262696 A1 * | 9/2014 | Gibson | F16G 1/10 198/847 |
| 2015/0259176 A1 * | 9/2015 | Goeser | B66B 7/062 428/189 |

FOREIGN PATENT DOCUMENTS

| | | |
|---|---|---|
| GB | 1056300 | 1/1967 |
| JP | 2003343656 A | 12/2003 |
| JP | 2004174772 A | 6/2004 |
| JP | 2004251402 A | 9/2004 |
| JP | 2007231978 A | 9/2007 |
| JP | 2008100365 A | 5/2008 |
| JP | 2013145032 A | 7/2013 |

OTHER PUBLICATIONS

Edited by A R Horrocks and S C Anand, Handbook of Technical Textiles, pp. 49-51, CRC Press, 2000.

* cited by examiner

FIG. 8A    FIG. 8B
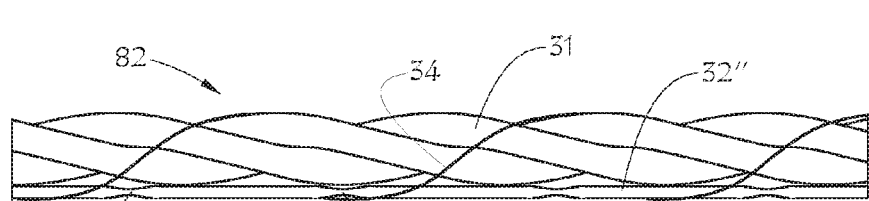
FIG. 9
FIG. 10
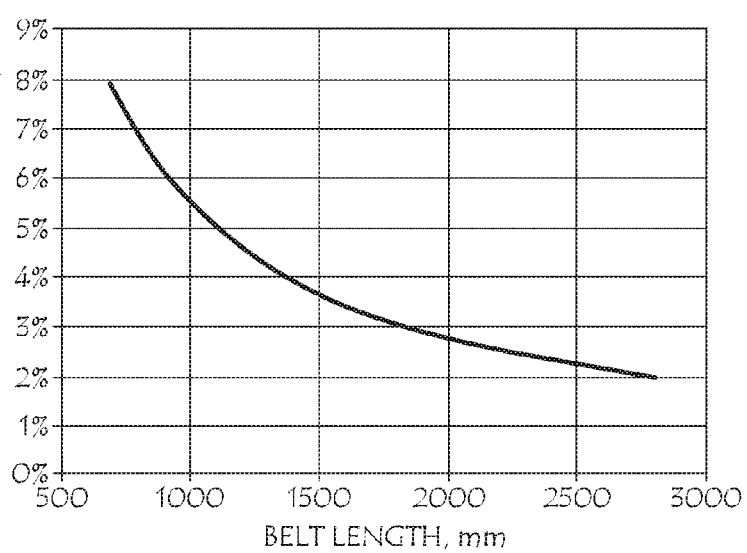
FIG. 5

TWO-COMPONENT CORD AND METHOD FOR MOLDED POWER TRANSMISSION BELTS

BACKGROUND OF THE INVENTION

1. Field of the Invention

This invention relates generally to tensile cord for endless power transmission belts, more particularly to a two-component cord useful in a belt molding process requiring a significant degree of cord extension during processing, and specifically to a belt tensile cord with a sacrificial component which "fails" during belt molding and the resulting belt.

2. Description of the Prior Art

Endless power transmission belts are well-known. Some of the common belt types include flat belts, V-belts, multi-ribbed belts, and toothed belts. Endless belts are often built by applying the various elastomeric layers, tensile members, and fabric layers onto a cylindrical mandrel, then curing or vulcanizing in a shell or bag under radially inward pressure with heat, as disclosed for example in U.S. Pat. No. 3,078,206. Building processes include upright and inverted processes. Depending on the process used, various finishing steps may be required, such as inverting, cutting, grinding, and profiling. Belt profiles may be formed by cutting or grinding after molding or by molding during vulcanization. Other building processes use an expanding mold or mandrel to press the various layered materials outward into the shell or bag, i.e., curing under radially outward pressure with heat. Such processes are disclosed for example in U.S. Pat. Appl. Pub. No. 2010/0173740 A1, U.S. Pat. No. 6,609,990 B2, JP 2004-174772 A, and JP 2004-251402 A. Molded belts may utilize a profiled mandrel or a profiled shell or bag. U.S. Pat. No. 4,184,822 discloses applying both inwardly and outwardly directed pressures against the belt body. Each of these variations has strengths and weaknesses.

In the case of molding belts with a profile formed by pressing a slab of belt materials radially outward into a rigid, profiled shell, tensile members must move with the slab material layers and stretch and also may move through the elastomeric layers which are applied to an expanding mold or mandrel under the tensile member. In some cases, particularly where the tensile member is required to stretch, the amount of expansion during the molding process may be detrimental to the tensile member. In other cases, particularly where the tensile member cannot stretch, the expansion leads to problems such as too much tensile cord movement within the expanding slab and poor cord alignment in the finished belt.

What is needed is an improved tensile member construction and method for molding endless belts on expanding molds or mandrels.

SUMMARY

The present invention is directed to systems and methods which provide improved tensile member constructions and methods for molding belts on expanding molds, and to the resulting belts.

The present invention is directed to a two-component tensile cord for reinforcing endless belts. The precursor cord includes a tensile component and a sacrificial component, which is sacrificed during processing of the belt.

The present invention is also directed to belts having such a two-component cord, i.e., a tensile component and a sacrificed component. The sacrificed component of the cord may be a plurality of discontinuous segments as a result of breaking during belt processing. The sacrificed component may have yielded in multiple locations and may have a plurality of weakened sections. The sacrificed component may have melted during processing of the belt.

The present invention is also directed to a method wherein a two-component cord is applied to an expandable mandrel along with other belt materials, then expanded radially outward into a cylindrical shell, resulting in one-component losing integrity during expansion. Loss of integrity may be from breaking or yielding under the tensile strain of the expansion, or from melting, or a combination thereof.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 5 is a graph representing a typical relationship between a molding process parameter and a molded belt parameter;

FIG. 8 is a partially fragmented side view and cross section of a tensile cord according to another embodiment of the invention before processing according to an embodiment of the invention;

FIG. 9 is a partially fragmented side view of the tensile cord of FIG. 8 after processing according to an embodiment of the invention; and FIG. 10 is a partially fragmented side view of the tensile cord of FIG. 8 after processing according to another embodiment of the invention.

DETAILED DESCRIPTION

Figure 1:
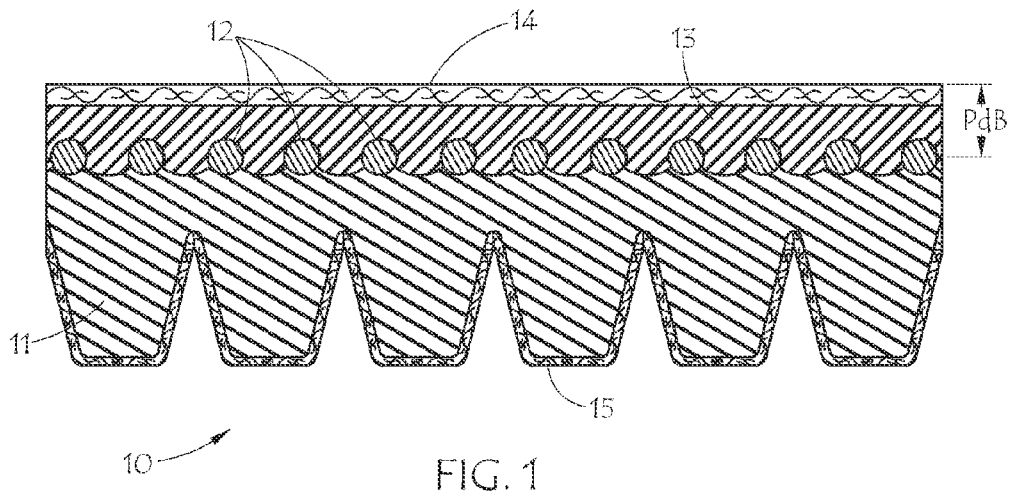
FIG. 1 is a cross sectional view of a portion of a multi-V-ribbed belt constructed in accordance with an embodiment of the present invention.

The improved tensile member for belt reinforcement includes two components. The tensile member is preferably a tensile cord with two material components. The first component is a tensile cord material and construction chosen with suitable strength, modulus and flexibility for use in the final belt product. By "cord" is meant the product of twisting together two or more yarns, i.e. a plied yarn. By "yarn" is meant a continuous strand of fibers, filaments, or material in suitable form for use in a cord. By "cord material" is meant the natural or synthetic polymer or inorganic chemical entities from which the fibers or filaments of the tensile cord are made. By cord or yarn "construction" is meant the physical arrangement of the fibers and materials of the cord, such as the plying, cabling, twisting, yarn size and the like. The first component also has sufficient stretchability for use in a molding process on an expanding mold. By "stretchability" is meant the amount of elongation a cord, yarn or material may experience without failing or permanent damage to the cord. Stretchability thus refers to substantially reversible elongation. The term "stretch" herein means a degree of elongation experienced by a cord or other material, e.g., during a processing step. In this context, cord or a cord component "failing" refers to a cord material breaking, yielding, or exhibiting a similar effect resulting in loss of integrity, strength or stretchability. The break point is defined by the "elongation at break" ("$E_b$%") and is not reversible. The second component is of high modulus, but is relatively weaker and/or of lower stretchability than the first component so that it cannot survive the forces and expansion of the belt molding process intact, i.e. the second component "fails" during molding. However, the second component is strong enough to survive all cord processing steps prior to the molding process, including for example, twisting, treating, and winding. Thus, the second component minimizes the stretch of the first component during all processing steps prior to the molding step, but is sacrificed during the molding step. The resulting belt may then have predominantly or essentially the tensile characteristics of the first component alone. Thus, the term "precursor" cord refers to the tensile cord prior to the belt molding process, namely, before the sacrificial second component has been sacrificed. The "tensile cord of the belt" refers to the cord in the final belt, i.e., after the sacrificial component has been sacrificed in the molding process. The terms "mold" and "mandrel" are often used interchangeably, but in one embodiment, the term "expandable mold" is used to indicate an assembly which may include a rigid "mandrel" with an expandable rubber pad on it. In general, however, any type of expandable mold or mandrel may be used in the practice of the invention.

The inventive tensile cord may be a combination or composite yarn, meaning of two or more different yarn types. The two components of the tensile cord may be formed of the same material, but with different constructions to provide the different properties required. The precursor cord may be a core-insert or covered yarn, with the sacrificial component as the core and the tensile component as the cover. Many other embodiments are possible and will be discussed in what follows. The precursor cord may be treated with sizing, adhesive(s), overcoat(s), or the like using any desired adhesive, treatment, or treatment process known in the art. The term "twist multiplier" or "TM" will be utilized to describe the level of twist of a yarn or cord, and is defined as the ratio of the turns per inch (TPI) to the square root of the yarn count. Yarn count is defined as the ratio of 5315 to the end denier in grams per 9000 meters. Thus, the following equation defines the twist multiplier:

$$TM = \frac{TPI}{\sqrt{5315/\text{denier}}}.$$

FIG. 1 is a sectional view of a V-ribbed belt embodiment, in a plane perpendicular to the belt longitudinal direction. The structure of the V-ribbed belt may be described with reference to FIG. 1. The V-ribbed belt 10 includes a rib-rubber layer 11 formed as a multi-ribbed structure, an adhesive rubber layer 13 in which tensile cords 12 are embedded, and a backing fabric 14 bonded to the back face of the adhesive rubber layer 13. In addition, the surface of the rib-rubber layer 11 may be covered with a fabric 15, such as nonwoven fabric, woven fabric or knitted fabric. It should be understood that a V-ribbed belt according to the invention may have fewer or more layers of rubber or fabric as desired.

The fabrics 14 and/or 15 may be selected from material(s) with sufficient stretchability. Furthermore, the material(s) may be selected so as to afford sufficient durability to the belt in consideration of the performance required of the rib and/or back surface (e.g., in terms of wear resistance, heat resistance, stability of friction coefficient, water resistance, and slip and noise properties). In conjunction therewith, the fabrics 14 and/or 15 may be rubberized or post-processed to enhance the performance and the post-processing includes washing with hot water or chemicals, heat-setting, dying, adhesive treating, and laminating. As for the adhesive treating, an additional treatment using gum Arabic, adhesives such as RFL, rubber, and/or resin (for example, phenol or fluoric resin), may be applied to the fabric(s) in order to enhance the adhesion of the fabric to the rubber material, or in order to obtain a performance characteristic required by the application. However, in some cases, no such additional treatment is applied.

Figure 2:
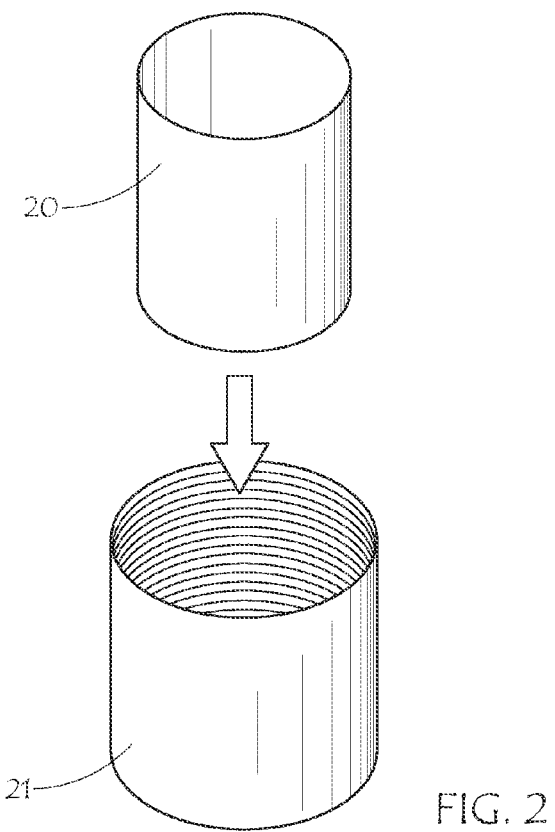
FIG. 2 is a representation of a molding apparatus for a process according to an embodiment of the invention.

A process for manufacturing the V-ribbed belt 10, in which an embodiment of the molding process is applied, will next be described with reference to FIGS. 2-4. FIG. 2 is a perspective view that schematically illustrates a mandrel 20 with rubber pad 22 (inner mold) and a shell 21 (outer mold) for molding the V-ribbed belt 10 in this embodiment.

Figure 3:
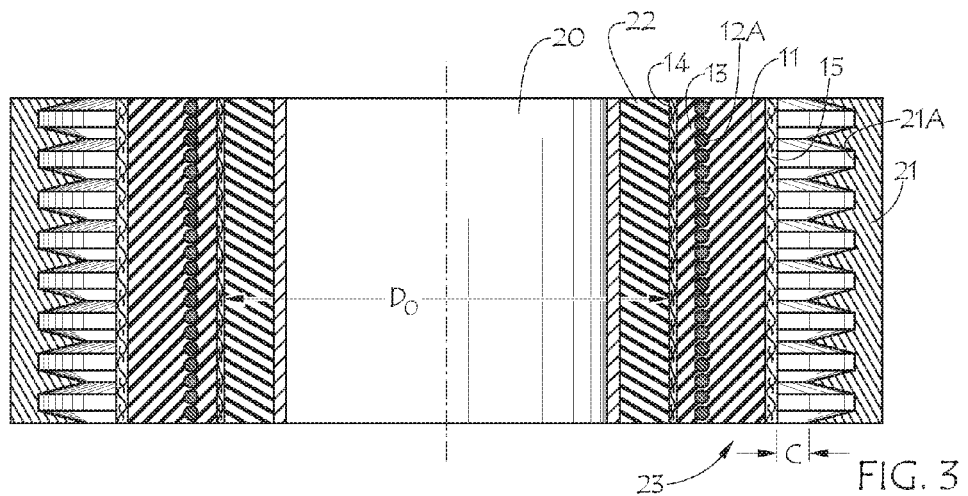
FIG. 3 is a cross sectional view of a portion of a process for making a multi-V-ribbed belt in accordance with an embodiment of the present invention.
Figure 4:
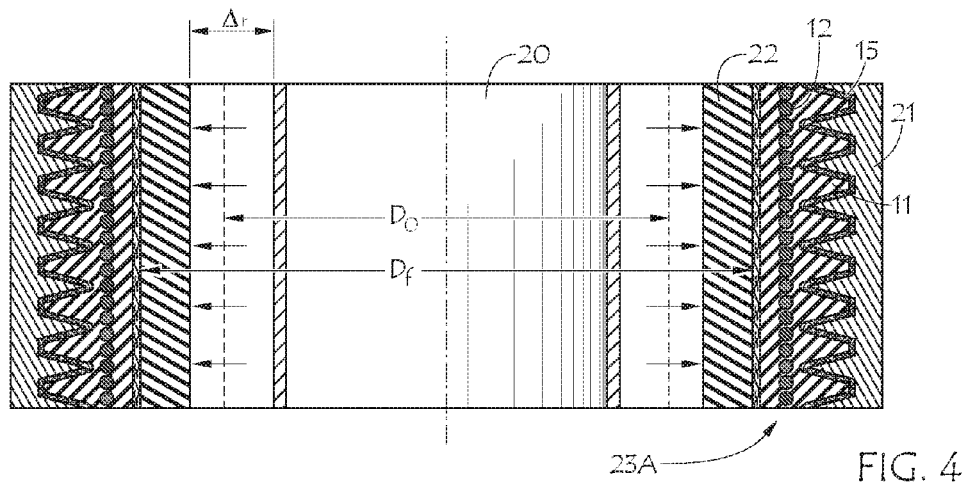
FIG. 4 is a cross sectional view of another portion of the process of FIG. 2.

FIGS. 3 and 4 are enlarged partial sectional views of the mandrel, rubber pad and the shell along the radial direction, which schematically illustrate their arrangement along with the placement of the belt materials. FIG. 3 illustrates the arrangement of the belt materials on the mandrel in the shell before expansion of the mold. FIG. 4 illustrates the arrangement after expansion, during vulcanization and curing.

A rubber pad 22 is arranged around the external circumference of the cylindrical mandrel 20, making it an expandable mold, and belt materials slab 23 is arranged around the outside of the rubber pad 22. The term "slab" refers to all the laid up belt materials before curing, which may include the backing fabric 14, an adhesive rubber matrix for forming the adhesive rubber layer 13, the intact or precursor tensile cords 12A, a rib rubber matrix for forming the rib rubber layer 11, and fabric 15. The precursor cords 12A may be helically wound onto the mandrel, and this is generally done at a constant winding tension which is much less than the strength of the cord, but which does result in some degree of cord extension (stretch) during winding. The optional fabric 15 may be tubular and either of seamless or seamed fabric.

However, non-tubular fabric can also be used by winding the fabric 15 around the mandrel 20 with both ends overlapping or butted together or in close proximity. The mandrel 20, onto which the belt materials slab 23 is provided, is coaxially installed inside the cylindrical shell 21. Alternately, the slab 23 could be built on a first mandrel and then transferred to an expandable mold for molding. Alternately, the slab 23 could be built on a first mandrel and then transferred into shell 21 after which an expandable mold may be inserted for molding. At this time, clearance C is interposed between slab 23 and the internal circumference of the shell 21 (i.e., between fabric 15 and shell 21), as shown in FIG. 3.

The shell 21 has a number of grooves 21A in the form of a V-ribbed structure on the internal circumference, wherein the grooves are aligned in the circumferential direction and are adapted to form the multi-ribbed structure of the V-ribbed belt 10. Other types of belt profiles could be used instead, such as transverse or helical teeth, notches, or even a flat or textured surface. In the curing process, any suitable temperature-controlled fluid medium such as air, nitrogen, oil, water or steam may be fed at high pressure between the rubber pad 22 and the mandrel 20, so that the rubber pad 22 is expanded outwardly in the radial direction. As a result, the belt materials 23 are expanded outwardly in the radial direction, and thereby pressed against the internal circumference of the shell 21. In this process, the fabric 15 is deformed together with the rib-rubber layer 11 of the belt material 23, and then forced into the grooves 21A formed on the internal circumference of the shell 21, thereby enabling a multi-ribbed structure to be formed, as shown in FIG. 4. Moreover, the fabric 15 is in pressurized contact with, or bonded to the rib-rubber layer 11 in the curing process, so that the fabric 15 and the surface of the rib-rubber layer 11 become integrated. In addition, during this process, the tensile layer is radially stretched outward, and therefore the cord 12 is stretched longitudinally. The initial mold diameter, i.e. mandrel plus rubber pad, is indicated as $D_0$ in FIG. 3, and the final mold diameter is indicated as $D_f$ in FIG. 4. The radial expansion of the mold (pad) is thus indicated as $\Delta r = \frac{1}{2}(D_f - D_0)$.

Thus, a belt molding process may be carried out in the following steps: provide the belt materials, including the tensile cord, around the mandrel; with the mandrel (onto which the belt materials are mounted) installed into the inside of the shell, expand the belt material toward the internal circumference of the shell; and press the materials against the inside of the shell while the curing process is carried out at suitable temperature and/or pressure. Then the cured belt slab may be removed and cut into finished belts of suitable width. The shell may have an internal profile suitable for the desired profile for the belts. For example, the shell may have circumferential V-grooves, thereby producing a plurality of V-ribbed belts 10.

With this description of the belt manufacturing process, the problems associated with cord expansion may now be explained in more detail. In the process described above, the tensile cord layer is radially expanded outward, thereby stretching the cord in the circumferential direction of the cylindrical mold, that is, in the belt longitudinal direction. The amount of stretch must be more than the slab-shell clearance C in order to also accommodate the rib formation. Clearance C is required in order to insert the belt materials and/or the mandrel with the slab of materials into the shell. However, clearance C may be substantially a fixed value regardless of the mold size, and it is desirable to make clearance C as small as practical in order to minimize the stretching of the materials during molding.

The stretch level imposed by the expanding mandrel (or rubber pad) is defined as the percent expansion in the pad circumference M %, and calculated as $M\% = (D_f - D_0)/D_0 \times 100\% = 2\Delta r/D_0 \times 100\%$. The actual cord stretch level experienced by the cord 12 may be less than the pad stretch, because the cord resistance may cause it to compress or pull into or through a portion of the underlying adhesive rubber layer 13 and/or backing fabric 14.

For very long belts with a very large radius mold, the M % will likely be much less than the elongation at break, $E_b$ % of the cord. The cord may thus survive the molding process in great shape. But a serious problem arises in certain situations for some high-modulus, low elongation, tensile cords when making belts of shorter belt length, BL. For short belts, there is a much smaller mold diameter $D_0$, but substantially the same clearance C and the same fixed expansion $\Delta r$ of the mold. Therefore, the percent mold expansion M % and the required cord stretch may be significant enough to result in significant damage to the cord during molding, resulting in shorter flex fatigue life in use, reduced belt tensile strength, or the like. In fact, for some belts, M % could even be close to or even greater than the elongation at break $E_b$ % of the cord, resulting in significant cord or fiber breakage. In addition, the amount of stretch during the molding is added to the cord treating stretch T % and the cord winding stretch W %, making the total stretch imposed on the cord during manufacturing even greater. The present invention effectively reduces the cord treating stretch T % and the winding stretch W %, thus extending the practical range of the molding process to much smaller belts than possible without the invention.

Some exemplary numerical examples serve to further explain the problem and illustrate the solution offered by the present invention. Referring to FIG. 5, a graph is shown that illustrates a typical relationship between mold expansion M % as a percent (assuming fixed C and $\Delta r$) versus belt length BL. Basically, as belt length increases, the percent stretch imposed by the molding process as described above decreases. Thus, M % may be in the range from 2 or 3% to 8 or 10% depending on BL, and regardless of the materials of the belt. For a typical treated polyester cord, which might exhibit an elongation at break, $E_b$ % of about 10%-13%, it would be desirable to avoid stretching the cord beyond about half of that $E_b$ % or about 5-6% or preferably less. Referring to FIG. 5, one finds that for such a polyester cord, the practical belt lengths that can be made by this process would be about 1200 mm or greater. On the other hand, for a typical treated para-aramid cord, which might exhibit an elongation at break, $E_b$ % of only about 4% to 5%, it would again be desirable to avoid stretching the cord beyond about half of that $E_b$ % or less than about 2.5% or less. Referring to FIG. 5, one finds that for such aramid cord, the practical belt lengths that can be made by this process would be severely limited to 2300 mm or greater.

There is a second aspect of the above described process which leads to a second problem in the resulting belts. The greater the M % of the process relative to the $E_b$ % of the cord, and the greater the cord modulus, the higher will be the stretching resistance of the cord during the expansion process. The greater the stretching resistance of the cord, the more likely the belt will have a bad cord-line position due to the cord pulling back through the rubber and toward or into the back fabric. Bad cord-line position can lead to shorter belt life, for example due to fatigue of the cord and/or cracking of the undercord material.

A partial solution to the above problems may include reducing the tensile cord modulus and/or increasing the cord $E_b$ % by choice of the cord construction and/or material(s). An example of using choice of cord construction to accomplish this is to increase the cord twist level. An example of using material choice to accomplish this is to co-twist the cord with a low modulus yarn or elastomer yarn. These approaches help to reduce the cord resistance somewhat and can also help reduce the danger of exceeding $E_b$ % during molding. However, the fact that the cord treating and winding steps are constant-tension processes means that the amount of extension or stretch of the cord during cord treating or winding will keep increasing as the modulus of the cord is reduced by twisting or material choice. Then there remains still insufficient stretchability for the subsequent expansion of the mold.

Thus, a better solution to the above problems includes adding a second component to the tensile cord which preserves stretchability of the cord during cord treating and cord winding and enables the cord to have a low stretching resistance during the subsequent molding step. The first component of the tensile cord is thus the primary tensile cord material, providing all the functional properties required of the cord in the finished belt. The second component which is added to the cord is a sacrificial component in the precursor cord and is "sacrificed" (for example, by breaking) in the finished belt. The second component must meet the following four physical requirements.

(1) The second component strength must be higher than the peak tensions applied to the precursor cord prior to the belt molding step. Namely, the second component tensile or yield strength must be greater than the tensions experienced during the cord treating step(s) (application of binders or adhesives or the like) and during the cord winding step(s) when the precursor cord is helically spiraled onto a mandrel to build up the belt slab. Preferably the strength of the second component is at least 10% higher than the highest forces experienced in cord treating and/or winding. The required component strength should be maintained or measured at the temperatures of the processes involved. For example, cord treating may involve drying and/or curing at temperatures of up to 180 to 220° C. Preferably the second component also has a very low elongation at break. As a result of this requirement, the second component will preserve maximum stretchability in the first component during the cord treating and winding steps prior to belt molding. The second component carries as much of the tension as possible during the treating/winding steps.

(2) The second component strength and elongation at break must be much less than the force and expansion generated during the molding step, considered at the molding temperature. As a result of this requirement, the second component of the tensile cord is easily broken, yielded, or somehow failed during the molding expansion step. If the second component strength is too high and the $E_b$ % is low (i.e., it has very high modulus), then the expansion of the mold may be prevented and the rib formation may not be complete. Also, even if the mold expansion is not prevented, too high resistance to expansion may cause cord-line position problems as described above. With a proper choice of the second component strength and stretchability, the second component will fail, i.e., be sacrificed, during the molding expansion and result in enough reduction in the cord resistance to extension to prevent any cord-line problems. The failing of the second component is preferably by breaking, but may instead or also involve yielding or melting at the molding temperature, provided the molding temperature is higher than the cord treating temperature mentioned in requirement (1), and provided the melting point or softening temperature is in between. The second component of the precursor cord is thus a sacrificial component, meaning it loses its strength or integrity during the molding process and thus may have minimal contribution to the final belt properties. Thus, the tensile component provides most or all of the tensile strength of the belt. In an embodiment, the $E_b$ % of the second component may be in the range from 2% to 3%, or from 1% to 4%, less than 5%. In another embodiment, the $E_b$ % of the first or tensile component is greater than that of the second or sacrificial component by a factor of two or more.

(3) The second component breaking strength should be as low as possible while meeting requirement (1) above. This will minimize the potential effect of the second component on the cord-line position. As a result of requirements (2) and (3) the second cord component may have minimal or no contribution to the final belt strength and a small effect on belt modulus. The longitudinal reinforcement, i.e., the tensile properties of the belt will be dominated by the first cord component.

(4) The second component should be small in diameter or volume so as to have a very limited impact on the final cord diameter. Thus, the second component should have no detrimental effect on the cord flex fatigue. The second component may be in the range of 10 to 20% or less, or less than 10%, or less than 15%, or less than 20% of the total cord volume. It has been found that at about 17% volume fraction or greater, the second component may become more difficult to twist into the precursor cord as a core yarn residing in the center of the cord.

Figures 6A, 6B:
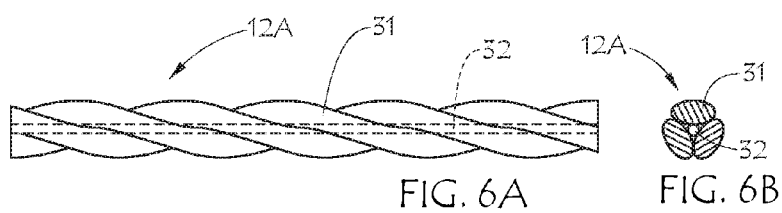
FIG. 6 is a partially fragmented side view and cross section of a tensile cord according to an embodiment of the invention before processing according to an embodiment of the invention.
Figure 7:
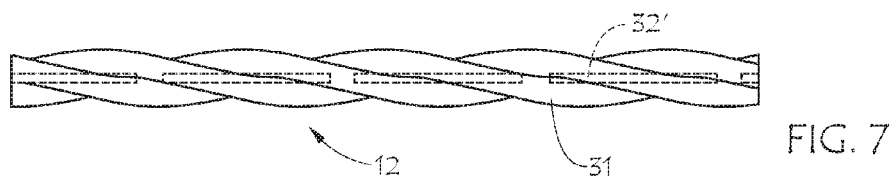
FIG. 7 is a partially fragmented side view of the tensile cord of FIG. 5 after processing according to an embodiment of the invention.

FIGS. 6 and 7 show one embodiment of the inventive tensile cord before and after the molding expansion process, respectively. Core-insert embodiment of precursor cord 12A includes a first component, the cover, which is a bundle of three twisted plies 31 of yarn twisted about or covering the sacrificial second component, core yarn 32. Cover plies 31 may be of any suitable cord material for the final belt product, such as polyester, aramid (including para-aramid, meta-aramid, or aramid copolymers), polyethylene naphthalate (PEN), nylon, glass, carbon, polyvinylalcohol (PVA), poly(p-phenylene-2,6-benzobisoxazole) (PBO), or the like. Core yarn 32 is preferably a high modulus, low elongation material such as aramid, polyester, glass, carbon, PBO, or the like. Sacrificial core yarn 32 is preferably of low or zero twist to minimize the elongation at break and chosen with a suitable diameter to meet the strength requirements and volume requirements mentioned above. Sacrificial component 32 may be in the form of a monofilament, a yarn, a ribbon, a tubular film or the like. It should be recognized that each component need not necessarily be made from one material or fiber type, as long as each component satisfies the requirements mentioned above.

FIG. 7 illustrates the final tensile cord 12 as it would appear in the belt after stretching in the molding expansion process. The now sacrificed core yarn 32' ends up broken into a plurality of segments distributed longitudinally throughout the tensile cord. These broken pieces may be somewhat uniform segments or segments of substantially similar length or of somewhat variable length. The discontinuous segments may then provide only minimal contribution to the strength or stretchability of the remaining intact first component 31.

FIG. 8 shows another embodiment of the inventive precursor tensile cord before the molding expansion process. Precursor cord embodiment 82A includes first component which is a bundle of three twisted plies 31 of yarn as in the first embodiment (12A). However, the sacrificial second component 32 is not inserted into the twisted plies 31, but laid and/or attached alongside the first component. The materials and constructions of plies 31 and second component 32 may be chosen in the same way as for the first embodiment. The second component 32 may be glued or adhesively fastened to first component 31, or component 32 may be attached to component 31 by wrapping with thread 34, which may be for example a very small cotton yarn. The second component may be in the form of monofilament, yarn, ribbon, or a tubular film which may surround the first component twisted bundle.

FIG. 9 illustrates the final tensile cord 82 as it would appear in the belt after stretching precursor cord 82A in the molding expansion process. The now sacrificed second component yarn 32" ends up broken into segments which can be substantially uniform or of variable length, but which then provide minimal contribution to the strength or stretchability of the remaining intact first component 31.

FIG. 10 illustrates what another type of sacrificial failure mode might look like. In FIG. 10, the final tensile cord 84 is shown as having yielded in the belt due to stretching a precursor cord like 82A in the molding expansion process. The now sacrificed second component yarn 32" ends up necked down in multiple locations resulting in a plurality of substantially weakened segments of yielded material which can be substantially uniform or of variable length, but which provide much less contribution to the strength or stretchability of the intact first component 31 than before yielding. A sacrificial second component that fails by melting might have a similar appearance, or be much more grossly deformed from melting. After sacrificial melting releases the stretchability of the first component, and after completion of the molding process, the molten second component may resolidify, and thus the melted material may actually have a significant contribution to the tensile properties of the final belt.

The following examples illustrate the application, utility and benefits of the invention. Comparative Examples are indicated with the abbreviation "Comp. Ex.".

EXAMPLE SERIES A

Polyester Cord

The base cord for this first series of examples is of the polyester, polyethylene terephthalate (PET) filaments. Typical treated polyester cord has an elongation at break of about 10-13%. Therefore, the process used should not exceed about 6% stretch in order to prevent damage to the cord. FIG. 5 suggests that belts longer than 1200 mm might not be a problem in an expanding mandrel process. However, belts less than 1000 mm long are at high risk of cord damage since the stretch during belt molding can reach 6-8%. The processing of the cord, including treating and winding of the cord onto a mandrel, uses up some of the stretchability, further increasing the risk of cord damage during molding. The cord elongation can be increased by twisting the polyester yarns. The higher the twist level, the higher the stretchability and elongation at break, but the lower the modulus. The lower the modulus, the more stretchability lost during processing of the cord. Thus, increasing twist has limited ultimate benefit. Therefore, according to embodiments of the invention, in this series of examples, sacrificial yarns of glass or aramid are added to the polyester cord to reduce the amount of stretchability lost during processing and to release the inherent stretchability of the polyester during molding. It will be seen that the higher the level of twist in the cord, the more stretchability can be preserved by the sacrificial component.

Table 1 shows the cord constructions tested in this Series A. All cords are based on a 6600 dtex polyester cord consisting of 3 yarns (2200-1/3 dtex), each twisted one direction at a twist multiplier (TM) indicated in the table, and then all three twisted together in the opposite direction at an equal TM. This is thus a plied cord with balanced twist. The sacrificial second component is included with the three plies during the second twisting step. The second component is included as a core-insert yarn with the three polyester yarns wrapped around it. Three sacrificial component materials were included as indicated in the table. The Kevlar 49 (K49) and glass (G75) materials have low $E_b$ % as indicated in the footnotes of the Table 1. The K49 has no twist and the G75 a light twist of 0.7 turns per inch (tpi) as received. The polyvinylalcohol (PVA) has a moderate $E_b$ %. The cords were subjected to a dip treatment followed by drying and curing in a heated oven. Typical cord treating tensions are 20-30 N/end (4.5-6.7 lb.), and typical treating temperatures are up to 220° C., or 180° C. to 220° C.

From Table 1, one can see that if the cord is stretched 6.3% in a subsequent belt molding process, the comparative examples 1 and 4, which have no second component, will be at half or more of their ultimate elongation and subject to possible irreversible damage. Even though Comp. Ex. 4 has a lot more twist and therefore more stretchability than Comp. Ex. 1, it does not have much better likelihood of surviving the mold stretch without damage.

The PVA examples, 3 and 6, give mixed results. The elongation at break of PVA is about 7%, so the PVA component in Comp. Ex. 3 does not provide much benefit. However, for Ex. 6, the higher twist of the polyester component makes for greater differentiation between the two cord components so that the PVA does give some benefit. However, it is clear that for these examples, the lower stretchability of the glass and aramid gives much better results. Thus, it is preferable that the second component have an elongation at break or yield of 2-3% or less than about 6%.

The cords of Table 1 were then made into multi-v-ribbed belts (6PK1070) in an expanding-mold process as described herein. Typical cord winding tensions are 10-30 N/end (2.2-6.7 lb.) at room temperature, which is less than the breaking tensile strength, $T_b$, of the second component shown in the footnotes of Table 1. The cord spacing is typically based on the percent of the belt width covered by cord, typically from 60 or 70% up to 90 or 100% cord packing. These belts had about 80% cord packing Higher packing can be better for reducing rubber flow through the cord line. The belt materials in the slab included a fabric back coated with rubber layer, adhesion gum, cord, under-cord rubber. Optionally a rib surface cover could be included. The resulting belt thickness was 4.4 mm, and the belt length was 1070 mm. The slab stretch during molding was calculated to be 6.3%.

TABLE 1

|  | Comp. Ex. 1 | Ex. 2 | Comp. Ex. 3 | Comp. Ex. 4 | Ex. 5 | Ex. 6 | Ex. 7 |
| --- | --- | --- | --- | --- | --- | --- | --- |
| $1^{st}$ component[1] | PET | PET | PET | PET | PET | PET | PET |
| twist level (TM) | 2.5 | 2.5 | 2.5 | 6.0 | 6.0 | 6.0 | 6.0 |
| $2^{nd}$ component | none | K49[2] | PVA[3] | none | K49 | PVA | G75[4] |
| $E_b$ % Greige cord | 13.8 | 12.5 | 12.3 | 20.7 | 18.5 | 19 | 18.4 |
| $E_b$ % Treated cord | 11.8 | 12.7 | 11.8 | 12.8 | 15.6 | 12.8 | 15.9 |

TABLE 1-continued

|  | Comp. Ex. 1 | Ex. 2 | Comp. Ex. 3 | Comp. Ex. 4 | Ex. 5 | Ex. 6 | Ex. 7 |
|---|---|---|---|---|---|---|---|
| Stretch consumed | 2.1 | −0.2 | 0.5 | 7.8 | 2.9 | 6.2 | 2.5 |
| M %[5]/$E_b$ % | 0.53 | 0.50 | 0.53 | 0.49 | 0.40 | 0.49 | 0.40 |
| Cord line position (PdB) (mm) | 0.68 | 0.69 | 0.70 | 0.67 | 0.95 | 0.79 | 1.40 |
| Belt modulus (kN/rib/strand) | 18.5 | 20.2 | 19.9 | 15 | 17.3 | 14.5 | 17.4 |
| Belt tensile strength (N/rib/strand) | 1160 | 1100 | 1050 | 980 | 980 | 940 | 830 |
| Strength Ratio (belt/treated cord) | 0.86 | 0.85 | 0.81 | 0.86 | 0.85 | 0.90 | 0.90 |

[1]all 2200⅓ plied construction
[2]DuPont Kevlar ™ 49, 217 dtex, $T_b$ = 45N, $E_b$ = 2.2%
[3]Kuraray Kuralon ™ 5501, 500 dtex, $T_b$ = 49N, $E_b$ = 7.0%
[4]PPG glass fiber, G75/1383, 680 dtex, $T_b$ = 34N, $E_b$ = 2.5%
[5]Mold stretch is assumed to be 6.3% for all.

Cord-line position in the final belts (PdB), the distance between the backside and the cord center line as shown in FIG. 1, was used as an important measure for cord resistance during the molding. Cord-line positions were measured on each cord at four different cross sections cut at equal intervals around a belt. One or two belts were sampled this way from each cord variable. The average of these PdB measurements is presented in Table 1. Ex. 5-7 show a great improvement in cord line position over the single-component examples. The second component in the cord preserves the stretchability of the first component during cord treatment and cord winding. Then the second component breaks during molding resulting in the first component now having a much lower modulus than in the control examples where the stretch is significantly used up by the treating and winding processes. Thus, the cord does not pull down into the rubber very far for Ex. 5-7, while Ex. 1-4 have poor PdB. This aspect of the invention represents a very significant improvement over the state of the art. It may also be pointed out that in general, it was observed that the greater the pull down of the cord into the rubber, the greater the variability of the cord position as indicated by the range, standard deviation or covariance of the cord line measurements (not shown). Thus, the improvement includes that less cord pull through may be associated with less position variability.

Belt modulus was also measured and the results shown in Table 1. Belt modulus gives an indication if the cord was tensioned fully to give an expected modulus level. Higher twist cord is expected to have lower modulus. Ex. 5 and 7, which have the best PdB results (K49 & G75 at TM6.0) have the expected belt modulus. It should be noted that the second component gives the belts a somewhat higher modulus than the control variables, indicating that the high modulus second component can still contribute somewhat to modulus even when broken in pieces, though most of the modulus is attributed to the first component.

Belt tensile strength was also measured and the results shown in Table 1. Belt tensile strength gives an indication if the cord was damaged by the stretch during belt molding. The ratios of treated cord strength to belt tensile strength per cord can indicate damage. Higher twist cord is expected to have lower belt tensile strength, but less damage. The ratios of treated cord strength to belt tensile strength are 0.85-0.90, similar to controls. The broken second component does not contribute to belt tensile strength.

Of the good PdB variables, K49 has the same tensile strength and has the expected belt modulus, while G75 has a little lower tensile strength than expected. The difference in belt tensile strength is not related to belt molding since the belt strength is directly related to the strength of treated cord. Thus, the ratios of treated cord to belt tensile are all in the 0.85-0.90 range, similar to the controls.

The results of the first series indicate that twist level of the cord affects the results, so that the invention is more effective at the higher TM than at the lower TM. Therefore, the K49 and G75 examples (Ex. 5 and 7) were repeated at a twist multiplier of 4.5. The belt modulus for both variables was about 21 kN/rib/strand, slightly higher than the 2.5 TM control (Comp. Ex. 1). The belt strength was comparable to the 2.5 TM control. In addition, the ratio of belt cord strength to treated cord strength was 0.87 and 0.89, respectively, right in the range of the data of Table 1. The cord line position for both 4.5 TM variables was 0.90 mm, a definite improvement over the controls.

It may be noted that the length distribution of the broken segments depends on at least the material type of the second component and the cord twist. The broken core was removed from the belts for the examples. The segment lengths of the K49 and G75 were similar to each other and both much greater than the segment lengths of the K5501 at a given twist level. For a given material, the segment lengths from the TM2.5 cords were much greater than the segment lengths from the TM6.0 cords.

EXAMPLE SERIES B

Aramid Cord

The base cord for this second series of examples is of para-substituted aromatic polyamide filaments (para-aramid or aramid for short). Typical treated aramid cord has an elongation at break of about 4-5%. Therefore, the process used should not exceed about 2-3% stretch in order to prevent damage to the cord. FIG. 5 suggests that belts longer than 2300 mm might not be a problem in an expanding-mandrel process. However, belts less than 2000 mm long are at high risk of cord damage since the stretch during belt molding can reach over 3%. In this series of examples, sacrificial yarns of glass or aramid are added to twisted aramid cord to reduce the amount of stretchability lost during processing and winding and to release the inherent stretchability of the aramid during molding.

Table 2 shows the cord constructions tested in this Series B. All cords are based on a 4400 dtex aramid cord consisting of 4 yarns (1100-1/4 dtex), each twisted one direction at a first TM indicated in the table, and then all four twisted together in the opposite direction at a second TM indicated in the table. This is thus a plied cord, but some with unbalanced twist. The sacrificial second component is included with the four plies during the second twisting step. The second component is included as a core-insert yarn with the four aramid yarns twisted or wrapped around it. Three sacrificial component materials were studied as indicated in the table. In addition to K49 and G75 glass, a larger glass fiber G37 was included, although its Tb is higher than the other two options. All have low $E_b$ % as indicated in the footnotes of the Table 2. The cords were subjected to a treatment as in the first series. Then, multi-v-ribbed belts of length 1543 mm (6PK1543) were molded in the same way as in the first series, with 80% cord packing Belt thickness was again 4.4 mm, but the calculated slab stretch during molding was 2.6%. It should be noted that the control cord failed during molding in this process. For reference, a polyester control belt was referred to for a desirable PdB of about 1.3 mm.

Referring to Table 2, the higher twisted cords (both greige and treated) have much higher Eb % compared to the TM4×4 control (Comp. Ex. 8). In addition, all of the 2-component variables (Ex. 9-13) have a low ratio of M %/Eb % (well under 0.5, at 0.4 or less), indicating they should be able to handle an expanding mandrel with 2.6% stretch for making a belt with length about 1500 mm. Note that the control has a ratio of 0.54, indicating a large risk of damage during molding. In fact, the control cord (Comp. Ex. 8) failed during molding, so could not be used to make belts by this process due to lack of stretchability.

All the belts of Ex. 9-13 exhibited very good cord line positions, with PdB ranging from 1.0 to 1.3 mm. This represents a clear and significant improvement compared to the control variable which could not even be processed. The examples also exhibited good modulus and tensile strength.

However G37, as a second component, was not well positioned at the center of a cord (i.e., at the core) due to its larger size and larger volume fraction of the cord. Thus, $V_f=17\%$ may be border line for a core-insert type cord construction with two components as described herein. As in the PET cords of series A, the para-aramid cords of series B in the molded belts had the core second component broken into segments. For example, the K49 core in the TM4×8 cord (Ex. 13) had an average segment length of about 6.4 mm.

The results of the second series also indicate that twist level of the cord affects the results, so that the invention is more effective at the higher TM than at the lower TM. Therefore, a number of additional twist levels, including balanced twists, were examined utilizing the same base aramid cord with K49 or G75 as the second component. Very good results were obtained with either G75 or K49 cores in aramid cord with balanced twists at a TM of 5.0 and 6.0, and with K49 in an unbalanced cord with TM4×7. In many cases it was observed that the inventive process and cords resulted in belts with higher modulus and strength, while maintaining a favorable cord line position, than comparable belts molded on rigid (non-expanding) mandrels (followed by profile grinding). Thus, the current invention allows one to increase the twist level of a known cord to increase stretchability (and flexibility) while maintaining optimum belt modulus and strength. This is accomplished by including a second cord component that is sacrificed during an expanding molding process. This preserves the stretchability of the first cord component and optimizes the tensile properties of the first component in the final belt.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

TABLE 2

|  | Comp. Ex. 8 | Ex. 9 | Ex. 10 | Ex. 11 | Ex. 12 | Ex. 13 | Ex. 14 |
|---|---|---|---|---|---|---|---|
| $1^{st}$ component[1] | aramid | aramid | aramid | aramid | aramid | aramid | aramid |
| $1^{st}$ twist level (TM) | 4 | 4 | 4 | 4 | 4 | 4 |  |
| $2^{nd}$ twist level (TM) | 4 | 6 | 6 | 8 | 8 | 8 |  |
| $2^{nd}$ component | none | G75 | G37[2] | G75 | G37 | K49 |  |
| $E_b$ % Greige cord | 6.8 | 8.2 | 9.4 | 9.8 | 10.5 | 11.0 |  |
| $E_b$ % Treated cord | 4.8 | 6.5 | 7.2 | 6.5 | 6.6 | 8.6 |  |
| Stretch consumed | 2.0 | 1.7 | 2.2 | 3.3 | 3.9 | 2.4 |  |
| M %[4]/$E_b$ % | 0.54 | 0.40 | 0.36 | 0.40 | 0.39 | 0.30 |  |
| Cord line position[3] (PdB) (mm) | — | 1.03 | 1.22 | 1.11 | 1.29 | 1.08 |  |
| Belt modulus (kN/rib/strand) | — | 57.8 | 45.9 | 40.9 | 38.4 | 44.5 |  |
| Belt tensile strength (N/rib/strand) | — | 2050 | 1550 | 1390 | 1160 | 1760 |  |
| Strength Ratio (belt/treated cord) | — | 0.88 | 0.95 | 0.91 | 0.94 | 0.82 |  |

[1]All 1100¼ plied constructions.
[2]PPG glass fiber, G37/1383, 1360 dtex, $T_b$ = 68N, $E_b$ = 2.5%.
[3]A target value is 1.3 mm based on a polyester belt.
[4]Mold stretch is assumed to be 2.6% for all.

What is claimed is:

1. A belt comprising a tensile cord embedded in the belt, extending in a longitudinal direction, said tensile cord comprising two components: a tensile component and a sacrificed component, said two components comprise yarns, the tensile component comprising one or more continuous filament yarns of high modulus fibers, and the sacrificed component comprising a second yarn which is broken into a plurality of yarn segments of substantially similar length distributed longitudinally throughout the tensile cord.

2. The belt of claim 1 wherein said sacrificed component provides essentially no significant contribution to the breaking strength of the belt, and said tensile component provides most of the longitudinal tensile reinforcement of the belt.

3. The belt of claim 2 wherein said sacrificed component consists of a plurality of discontinuous segments.

4. The belt of claim 3 wherein said sacrificed component consists of a yarn or mono-filament, broken into a plurality of segments.

5. The belt of claim 4 wherein said tensile cord is a covered yarn having a core and a cover with said sacrificed component as the core and said tensile component as the cover.

6. The belt of claim 2 wherein said sacrificed component consists of a yielded material resulting in a plurality of substantially weakened sections distributed longitudinally throughout the tensile cord.

7. The belt of claim 2 wherein said sacrificed component consists of a melted material.

8. The belt of claim 1 wherein the elongation at break of said tensile component is greater than that of said sacrificed component by at least a factor of two.

9. The belt of claim 1 wherein the volume of said sacrificed component relative to the total tensile cord volume is 20% or less.

10. The belt of claim 1 wherein the elongation at break of said sacrificed component is about 5% or less at the molding temperature of the belt.

11. A tensile cord comprising two components: a tensile component and a sacrificed component; said tensile cord is the result of stretching a precursor cord of said tensile component and a sacrificial component beyond the elongation at break of said sacrificial component resulting in said sacrificed component.

12. The tensile cord of claim 11 having a covered yarn construction having a core and a cover with said sacrificed component as the core and said tensile component as the cover.

13. The tensile cord of claim 11 wherein said tensile component is polyester and said sacrificed component is aramid or glass.

14. The tensile cord of claim 11 wherein said tensile component is aramid and said sacrificed component is aramid or glass.

15. The tensile cord of claim 11 wherein said sacrificed component consists of a plurality of discontinuous segments.

16. A method comprising:
    placing belt materials on an expandable cylindrical mold and within a rigid cylindrical shell;
    expanding the mold radially outward thus pressing said materials into contact with said rigid shell;
    curing said materials at a molding temperature to form a belt sleeve; and
    removing said belt sleeve from said mold and shell;
    wherein said belt materials comprise a two-component tensile cord comprising a tensile component and a sacrificial component, and at least one of said expanding and curing steps includes sacrificing said sacrificial component of said cord, said expanding strains said tensile cord more than the elongation at break or yield point of said sacrificial component resulting in said sacrificing by breaking or yielding.

17. The method of claim 16 further comprising:
    treating said two-component tensile cord under a treating tension and at a treating temperature without sacrificing said sacrificial component before said placing, expanding and curing steps.

18. The method of claim 17 wherein said sacrificial component has a tensile strength and yield strength at said treating temperature at least 10% greater than said treating tension and an elongation of about 2% or less at said treating tension and temperature.

19. The method of claim 16 wherein said placing comprises helically winding said two-component tensile cord about said mold under a winding tension without sacrificing said sacrificial component.

20. The method of claim 19 wherein said sacrificial component has a tensile strength and yield strength at least 10% greater than said winding tension and an elongation of about 2% or less at said winding tension.

21. The method of claim 16 wherein the stretchability of said sacrificial component is about 5% or less at said molding temperature.

22. The method of claim 16 wherein said sacrificial component has a melting point less than said molding temperature resulting in said sacrificing by melting.

23. The method of claim 16 wherein said expanding expands said mold in the range of about 3% to 10% in radius.

* * * * *